May 7, 1968 A. C. CONDO, JR., ET AL 3,381,441
SYSTEM FOR PRODUCING LIQUID-FILLED PACKAGES
Filed July 19, 1965 6 Sheets-Sheet 1

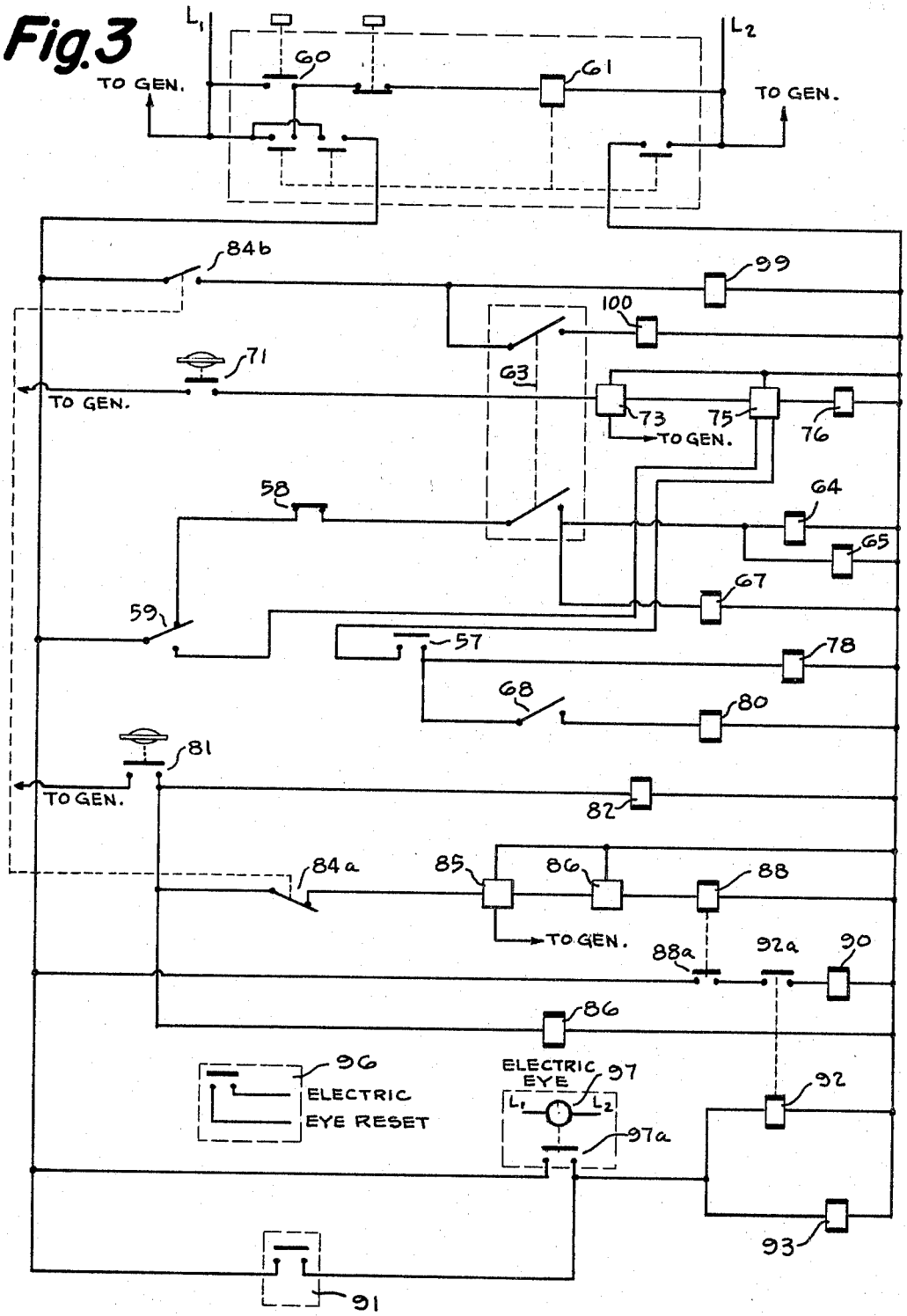

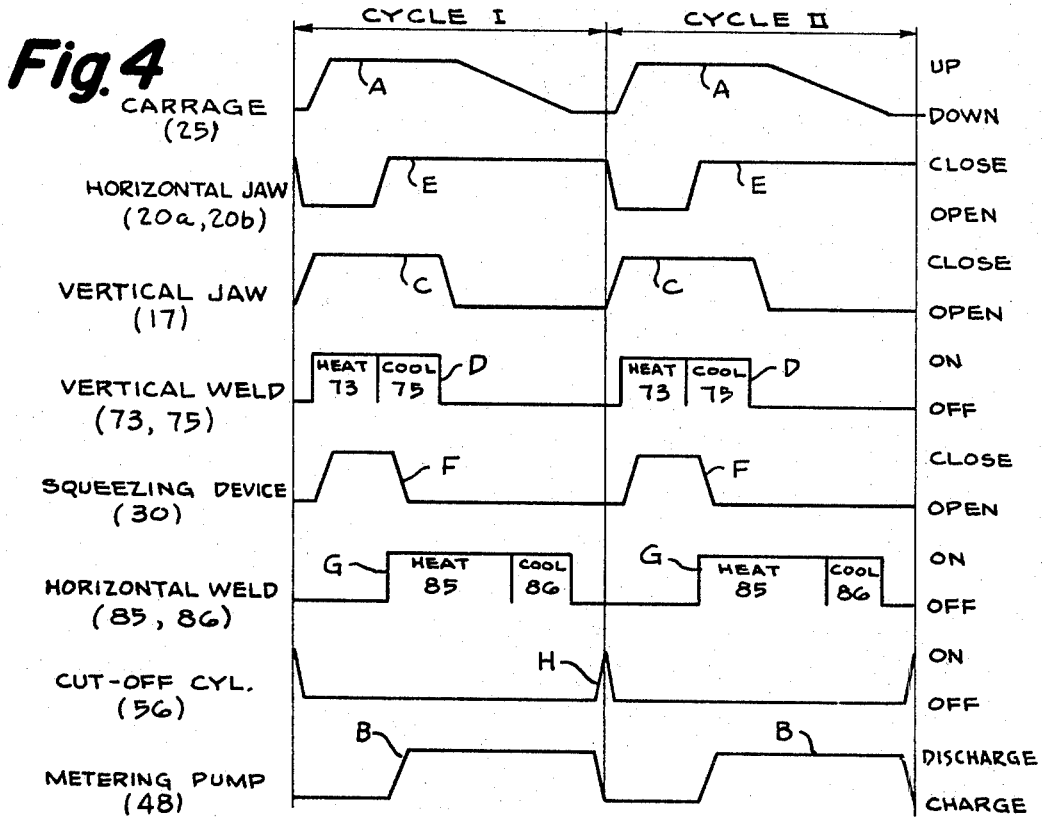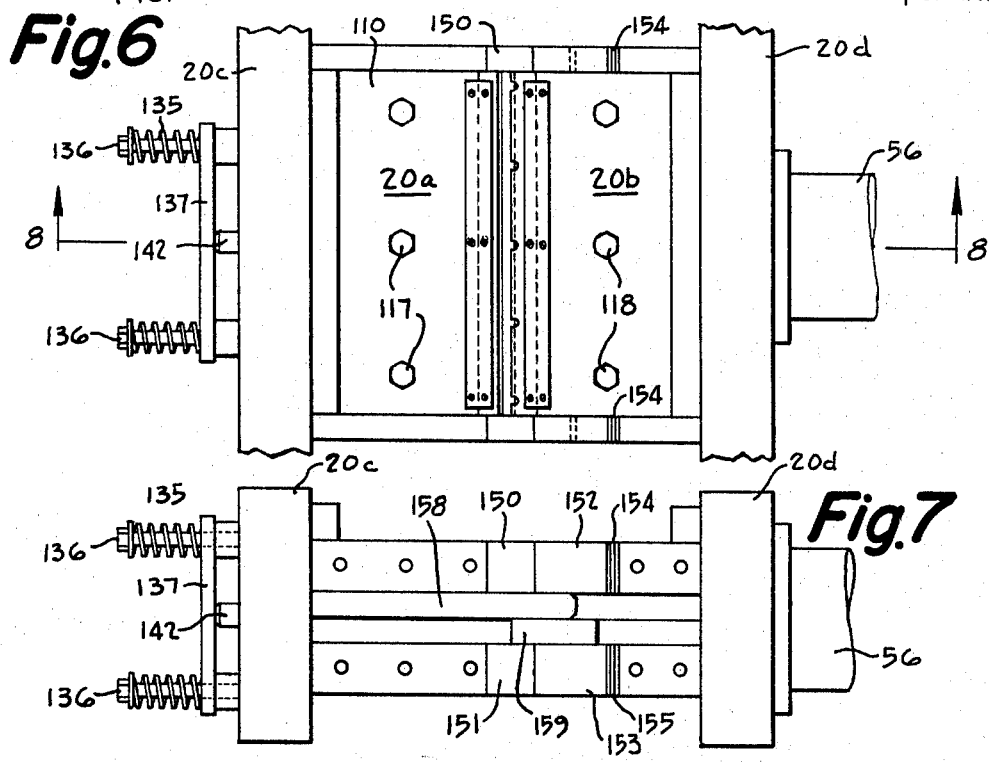

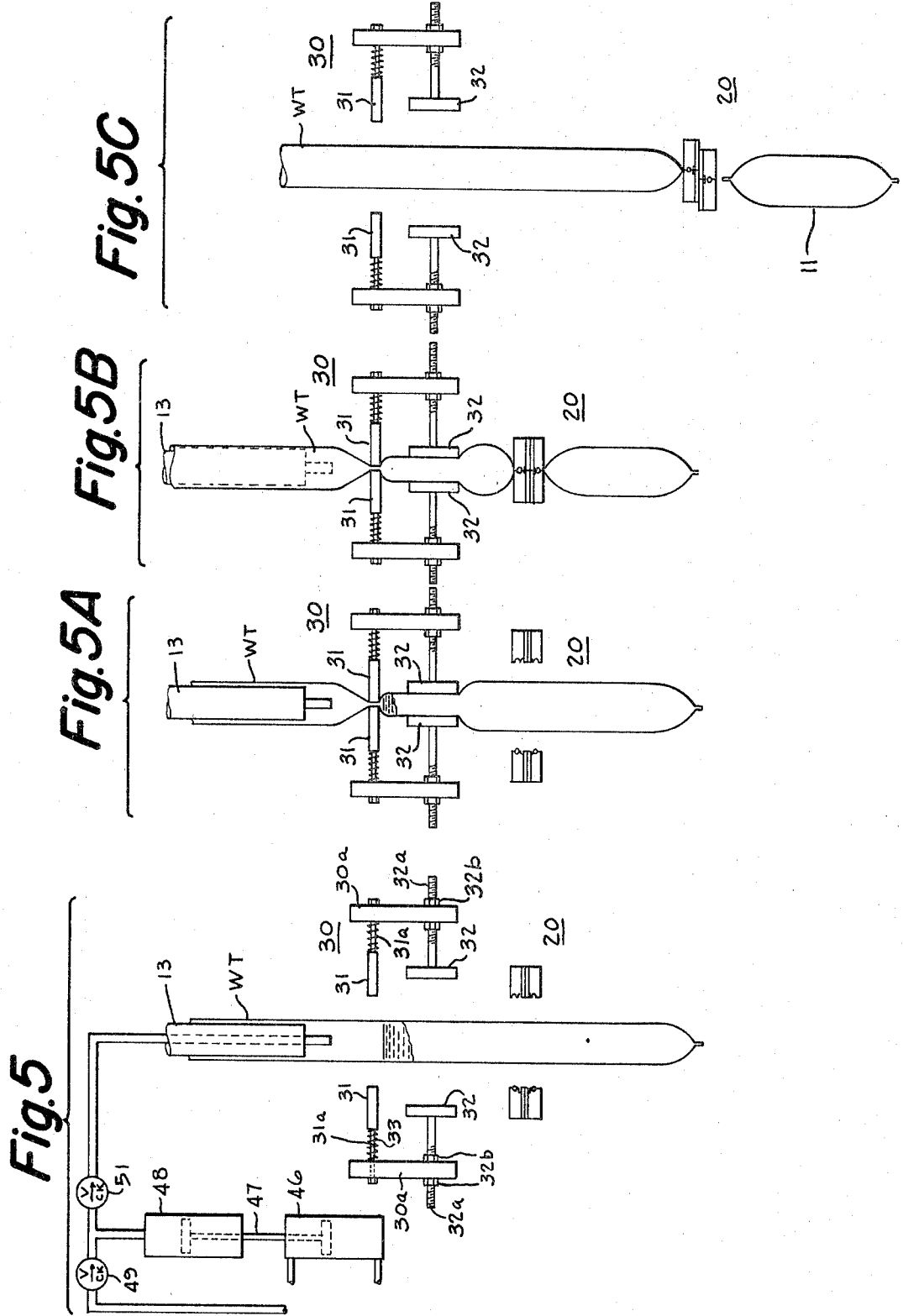

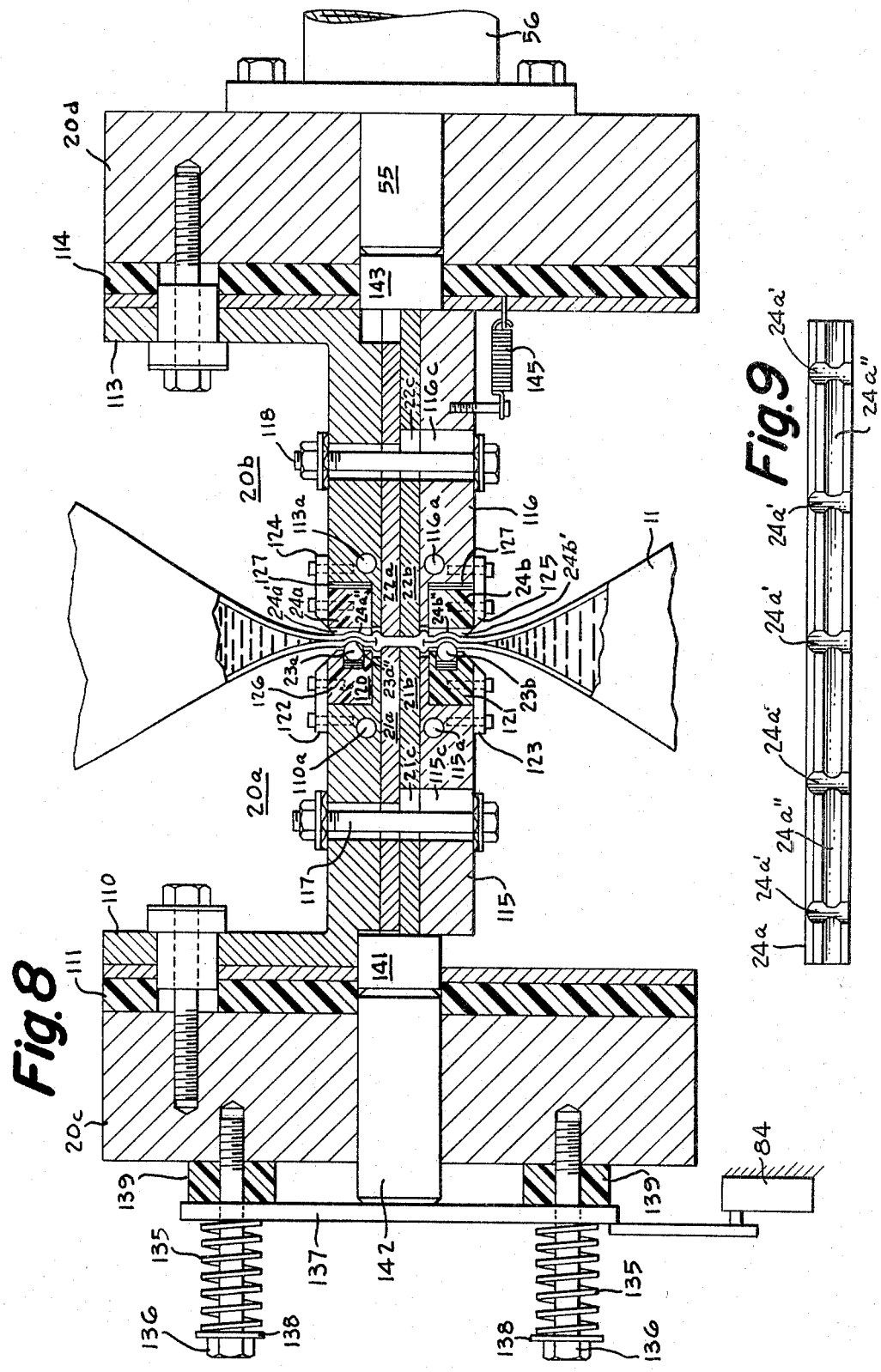

3,381,441
SYSTEM FOR PRODUCING LIQUID-
FILLED PACKAGES
Albert C. Condo, Jr., Newtown Square, and David D. Mynick, Melrose Park, Pa., assignors to Atlantic Richfield Company, Philadelphia, Pa., a corporation of Pennsylvania
Filed July 19, 1965, Ser. No. 472,774
17 Claims. (Cl. 53—24)

ABSTRACT OF THE DISCLOSURE

A system for producing liquid-filled packages including an improved method and apparatus for introducing liquid under pressure into packages and sealing the same through a column of the liquid while maintaining the pressure on the liquid in the package whereby the resulting package is completely and accurately filled.

---

This invention relates to a system for producing liquid-filled packages and has for an object an improved method and apparatus for introducing liquid under pressure into packages and sealing the same through a column of the liquid while maintaining the pressure on the liquid in the package whereby the resulting package is completely and accurately filled.

In prior arrangements, in order to control accuracy of fill, a constant volume of liquid was delivered to a pre-bag tube so that the liquid level was below the horizontal sealing jaws; such an arrangement is shown in Maxfield—2,154,521 and the resulting package is shown in Sonneborn et al.—2,350,836. Another method of filling liquid packages is the type utilized in Lakso—2,113,658 where a predetermined liquid level is maintained in the filling tube and the sealing jaws seal the web tube transversely through the liquid column and at a location below the liquid level. A further prior art method is disclosed in Aubin—2,917,879 where the jaws of an upper clamp close on the liquid column to prevent upward flow of the liquid by displacement when the lower horizontal welding jaws close to make the seal. While the first method produced an accurate fill, nevertheless, it resulted in a floppy and partially filled container which is undesirable. The other two methods tend to produce filled containers; however it is difficult to control the accuracy of fill due to errors arising from level of the liquid, length of the bag, diameter of the bag, variations in elasticity of the bag material due to temperature, lack of uniformity in film composition, etc.

The problems of the foregoing methods have been overcome at least to a substantial degree by the present invention. In accordance with the present invention there is provided a method of producing a liquid-filled package comprising the steps of forming a transverse seal at one end of a tube of web material, introducing a predetermined volume of liquid into the tube, clamping the tube at a location closely above the liquid level in the tube, partially flattening the tube at a location beneath the clamped end of the tube and the liquid level to force the liquid within the tube downwardly to a location adjacent the sealed end of the tube and transversely sealing the tube at a location beneath the partly flattened location.

It is another object of the invention to provide a liquid-filled package produced in accordance with the foregoing method.

Further in accordance with the present invention, there is provided apparatus for producing a liquid-filled package. The apparatus includes means for forming web material into a tube having at least one seal extending lengthwise thereof and sealing means for forming a transverse seal at one end of the tube. The apparatus includes means for introducing a predetermined volume of liquid into the tube and clamping means for clamping the tube at a location displaced from the sealed end of the tube to confine the liquid within the tube. There is provided means cooperating with the clamping means partially to flatten the tube at a location beneath the clamped end of the tube and below the liquid level to force the liquid within the tube downwardly to a location adjacent the sealed end of the tube, and means operable with first-named transverse sealing means for transversely sealing the tube at a location beneath the partially flattened location to complete the sealing of the liquid-filled package.

In accordance with a further aspect of the invention, the transverse seal of the tube of web material is produced by a high frequency sealing assembly. The sealing assembly comprises a pair of sealing electrodes positioned on one side of the tube and a second pair of sealing electrodes positioned on the opposite side of the tube and in aligned cooperative relation with the first pair. Means is provided for moving the pairs of electrodes into engagement with the opposite sides of the tube to produce a continuous weld area extending transversely of the tube, and means is also provided for moving one of the electrodes in each pair relative to the other electrode in each of the pairs and transversely of the axis of the tube to sever the tube intermediate the ends of the weld area.

In accordance with another aspect of the invention, there is provided a high frequency sealing assembly having a support adapted for reciprocal movement along the longitudinal axis of the tube of web material. At least one pair of sealing electrodes is carried by the support and positioned in cooperative relation on opposite sides of the tube. At least one pair of grippers is carried by the support and positioned in cooperative relation on opposite sides of the tube, one pair of grippers being positioned above the pair of electrodes and closely adjacent to each other. Means is provided for moving the grippers and the electrodes of the respective pairs into engagement with the opposite sides of the tube at a location below the level of the liquid in the tube to clamp the tube and produce a continuous weld area extending transversely of the tube, and groove structure is provided in the face of one of the grippers engaging the tube to permit escape of liquid entrapped in the tube between the weld area and the area of the tube clamped by the pair of grippers.

For a more detailed description of the invention and for further objects and advantages thereof, reference is to be had to the following description taken in conjunction with the accompanying drawings in which:

FIG. 3 is a schematic wiring diagram for the electrical system utilized with the schematic diagram shown in FIG. 2;

FIG. 4 is a timing diagram illustrating the operation of the various parts of the system of FIGS. 1 and 2;

FIGS. 5–5C are schematic diagrams illustrating the method of sealing the package of a liquid which is forced therein under pressure;

FIG. 6 is a top plan view of the high frequency sealing assembly of FIGS. 1 and 2;

FIG. 7 is an end view of FIG. 6;

FIG. 8 is a cross sectional view, at a larger scale, taken along the plane 8—8 in FIG. 6 illustrating the position of the welding electrodes during a welding operation to produce the transverse seal;

FIG. 9 is a front elevational view of the face of the non-resilient gripper which engages one side of the tube of web material.

Figure 1:
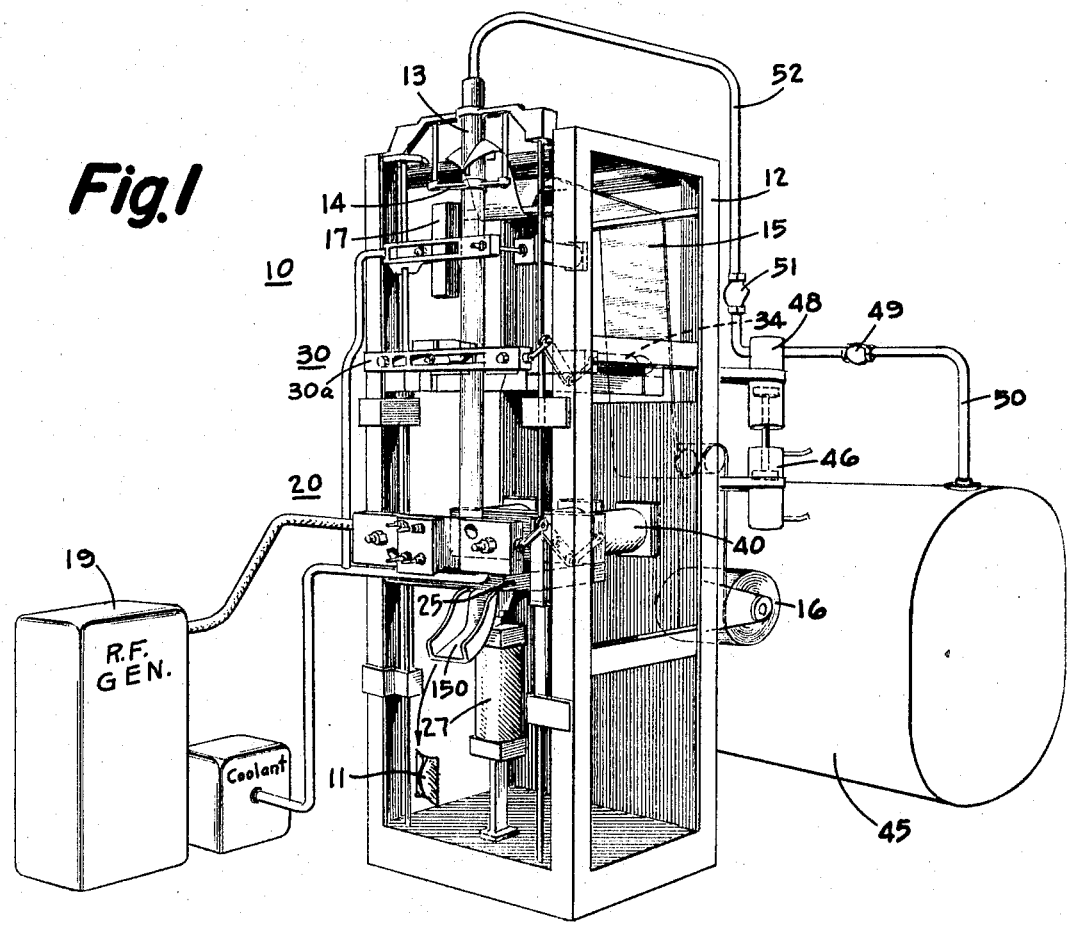
FIG. 1 is a perspective view of a system for packaging liquid in accordance with the present invention.
Figure 10:
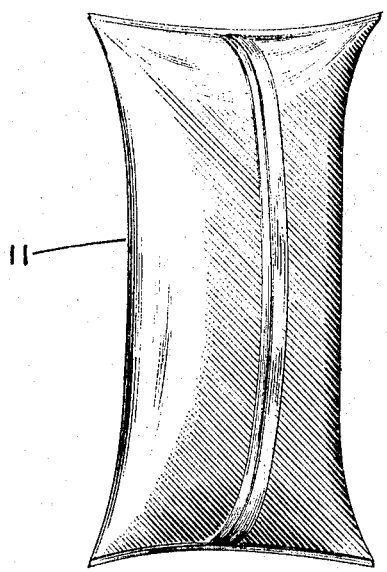
FIG. 10 is a perspective view of a liquid-filled package produced in accordance with the present invention.

Referring to FIG. 1 there is illustrated a packaging machine 10 embodying the present invention. While the invention is applicable for packaging various types of liquid products, it has been illustrated and will be described in connection with the packaging of motor oil. As pointed out above various attempts have been made heretofore to package motor oil in flexible containers. The most common method employed in packaging liquid and other flowable products has been to produce a package which was substantially larger in volume than the volume of liquid to be placed therein thus leaving a considerable amount of space at the top of the package so that the liquid would not interfere with the sealing. Such packages are soft and floppy. They present a relatively poor appearance and are difficult to handle and open. Liquid-filled packages of the type produced in accordance with the present invention, as illustrated in FIGS. 1 and 10 by the package 11, are firm and full and are provided with tight seams.

There are three main requirements in packaging liquid products in flexible packages to make them satisfactory for commercial use. Such requirements namely are: (1) accurate fill, (2) tight fill, and (3) absence of leaks. When packaging motor oil, it is necessary that the packages have a shelf life of from two to three years as some packages might not be used before the end of that period. The film composition used for the package must be compatible with the oil so as not to react with it during the foregoing period. The film must remain pliable throughout the period and not crack or harden as this would tend to create leaks. Additionally, the seals produced within the package must be sufficiently strong to last for the two to three year period. Flexible polyvinyl chloride (PVC) film has been found to be suitable for producing such liquid-filled packages and particularly the composition disclosed in copending application Ser. No. 473,182, filed July 19, 1965, by A. C. Condo, Jr. and W. E. Mendham.

As may be seen in FIG. 1, the machine 10 includes a vertical frame 12 which is adapted to support a hollow mandrel 13 in vertical position. The upper end of the mandrel 13 is provided with a collar 14 which is adapted to shape a film or web of PVC film 15 from a supply roll 16 into a vertical web tube about the mandrel 13. The opposed or overlapping edges of the web tube are adapted to be sealed or welded by means of a vertical sealing jaw or electrode 17 in combination with the mandrel 13 to which high frequency or radio frequency (RF) current is applied from a suitable radio frequency generator 19 of known type. The transverse or horizontal seals in the web tube are formed by a high frequency sealing assembly 20 which includes a pair of jaws 20a, 20b having opposed pairs of welding electrodes 21a, 21b and 22a, 22b, FIG. 2, also energized from the radio frequency generator 19. The jaws 20a, 20b of sealing assembly 20 also include opposed pairs of grippers 23a, 23b and 24a, 24b which are disposed closely above and below the electrodes 21a, 21b and 22a, 22b and are adapted to grip opposite sides of the web tube. The details of assembly 20 will be more fully described in connection with FIGS. 6–9.

Figure 2:
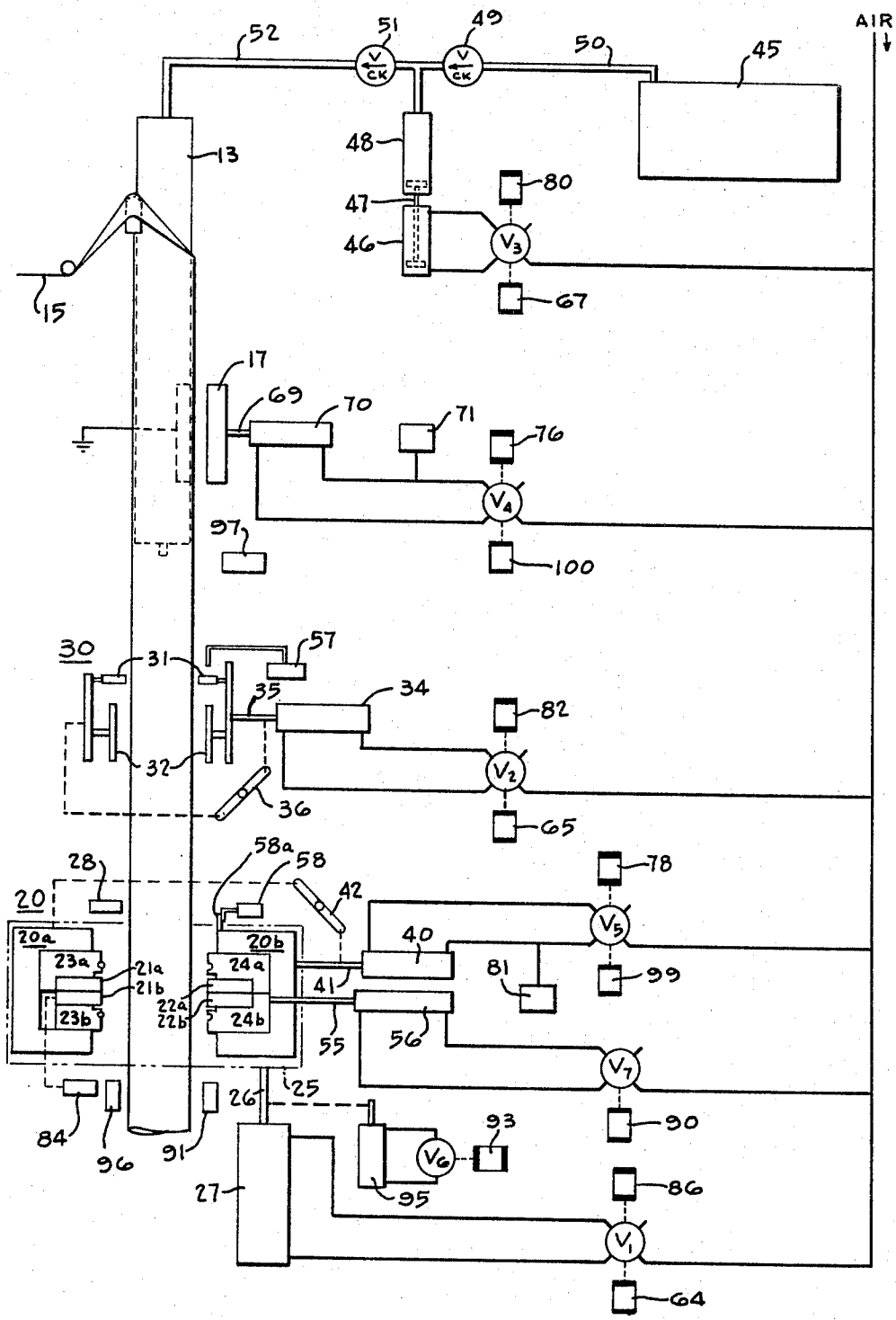
FIG. 2 is a schematic diagram of the system illustrated in FIG. 1.

As may be seen in FIG. 2, the sealing assembly 20 is carried by a support or carriage 25 which is adapted for reciprocal movement longitudinally of the mandrel 13 by means of pressure cylinder 27. The support 25 is carried by the piston 26 and is adapted to reciprocate up and down along the axis of mandrel 13 in accordance with the cycle illustrated in FIG. 4 by curve A. The length of stroke determines the length of the package to be produced.

Located intermediate the vertical welding jaw 17 and the horizontal welding jaws 21a, 21b and 22a, 22b in the sealing assembly 20 is a squeezing device 30 which is adapted to clamp off the column of liquid in the web tube and apply a predetermined pressure to the sides of the liquid column in the web tube to force the liquid downwardly into the pre-package portion of the web tube at the lower end of the mandrel 13 beneath the horizontal sealing jaws 20a, 20b. As later to be described more in detail in connection with FIGS. 5–5C, the device 30 includes a pair of opposed clamping members 31, 31 associated with a pair of depending pressure members 32, 32, the latter of which are adapted to engage the sides of the web tube at a location below the level of liquid in the web tube. The members 31 and 32 in device 30 are adapted to be moved into and out of clamping relation with the web tube by means of a pressure cylinder 34, FIG. 2, having a piston 35 which operates a linkage 36 interconnecting the opposed pairs of members in device 30.

The opposed pairs of grippers 23a, 23b and 24a, 24b are adapted to be moved into engagement with the opposite sides of the web tube by means of a pressure cylinder 40 having a piston 41 which is connected to one side of the grippers and which is also connected by means of a mechanical linkage 42 to the other gripper. The mechanical linkage 42 is similar to the mechanical linkage 36 both of which are of the known type including a fixed pivotal middle link which is adapted for pivotal movement about its center so that the jaw members connected to the opposite ends thereof will move equal distances during either a gripping or retracting movement.

The bulk product, i.e. motor oil, is adapted to be introduced in the system from a reservoir 45. A controlled volume pump 46 having a piston 47 is adapted to draw a measured volume of oil into the metering chamber 48 by way of a check valve 49 which is in the line 50 leading from the oil reservoir 45. On a reverse stroke of plunger 47 the measured volume of oil in chamber 48 is adapted to be forced through the check valve 51 in line 52 which leads to the upper end of the mandrel 13. This operation takes place once during each cycle of the system as illustrated by curve B in FIG. 4. The vertical welding jaw 17 is adapted to produce a weld of the overlapping longitudinal edges of the web material 15 during each cycle of the machine as indicated by the curve C. Radio frequency from generator 19 is applied to the electrode 17 during the initial portion of the period that the jaw 17 is held in closed position against the mandrel 13 is indicated by the "heat" portion of the curve D in FIG. 4. Coolant such, for example, as water or other suitable cooling liquid is passed through the electrode 17 following the heating portion of the cycle to cool the weld area of the web tube 15. The cooling portion of the cycle is also illustrated in curve D in FIG. 4.

It will be noted that the vertical weld is made while the carriage or support 25 for the horizontal sealing assembly 20 is in its up position preparatory to making its downward stroke. While the support 25 is in its upper position the jaws of the horizontal sealing assembly move from open to closed position as illustrated by curve E in FIG. 4. The gripping members 23a, 23b and 24a, 24b engage the opposite sides of the web tube through the column of liquid therein and pinch off the liquid on either side of the welding electrodes 21a, 21b and 22a, 22b. However, prior to closing of the horizontal grippers and horizontal electrodes as illustrated by curve E in FIG. 4 the squeezing device 30 moves to closed position to clamp off the web tube by clamping members 31, 31 which engage the web tube above the level of liquid therein while the depending members 32, 32 compress the opposite sides of the web tube and force the liquid therein in a downward direction toward the prebag portion of the web tube. After the horizontal grippers 23a, 23b and 24a, 24b have closed on the web tube as indicated by curve E in FIG. 4 the device 30 opens as illustrated by curve F in FIG. 4. While the horizontal grippers 23a, 23b and 24a, 24b are closed, the horizontal welding electrodes 21a, 21b and 22a, 22b move to closed or welding position and during the "heat" portion of the cycle, as shown by curve G in FIG. 4, produce the weld area in the web tube. The horizontal jaws 20a, 20b are adapted to have a coolant or liquid pass continuously therethrough similar to electrode 17 and the weld area of the web tube is cooled during the "cool" portion of the cycle illustrated by curve G in FIG. 4. The horizontal weld area produced in the web tube is of sufficient width and length to form the seal for the top of the filled package and also the seal for the bottom of the subsequent package to be filled.

As later to be described more in detail in connection with FIGS. 6–8 the bottom electrodes 21b and 22b are adapted for movement in a horizontal direction relative to the upper electrodes 21a and 22a by means of a piston 55 which projects from a pressure cylinder 56, FIG. 2. By moving the pair of electrodes 21b, 22b transversely of the longitudinal axis of the web tube while maintaining the other pair of electrodes 21a, 22a stationary the web tube will be severed transversely at a location intermediate the edges of the weld area. This cutting operation is illustrated in FIG. 4 by the curve H with the cut taking place prior to opening of the horizontal jaws 20a, 20b. After the cut is completed the horizontal jaws open as indicated by curve E and the foregoing cycle is repeated.

Referring to FIGS. 2 and 3 it will be seen that the various operations of the cycle illustrated in FIG. 4 are performed automatically by the system. In FIG. 3 it will be seen that the system is energized from power lines $L_1$ and $L_2$. Upon closing the starting switch 60 the coil of relay 61 is energized thereby closing the contacts of the starting relay. The radio frequency generator 19 is also connected with the line $L_1$, $L_2$. The cycle switch 63 is then closed thereby completing a circuit through the contacts of switches 58 and 59 and energizing the coils of relays 64 and 65, FIG. 3. Relay 64 is effective to operate valve $V_1$, FIG. 2, to move the carriage or support 25 for the horizontal sealing assembly to its up position shown by curve A in FIG. 4. The energization of the coil of relay 65 operates valve $V_2$, FIG. 2, which in turn causes the squeezing device 30 to move to closed position as shown by curve F in FIG. 4 and close the contacts of normally open switch 57, FIGS. 2 and 3. At this same time the coil of relay 67 is energized to load the metering chamber 48 with oil by operating valve $V_3$, FIG. 2.

It will be understood that the oil switch 68, FIG. 3, has previously been closed manually. When the system is being put into operation the vertical sealing jaw 17 is closed manually, FIG. 2. The jaw 17 is carried by a piston 69 of a pressure cylinder 70 which has a pressure switch 71 connected in one of the lines between the pressure cylinder 70 and its control valve $V_4$. Upon build-up of pressure in the vertical cylinder 70, the pressure switch 71 closes and as may be seen in FIG. 3 it energizes a weld timer 73 by connecting it across the lines $L_1$, $L_2$. The weld timer 73 is connected in the energizing circuit of the high frequency generator 19 shown in FIG. 1.

When the carriage 25 moves to its up position, the contacts of switch 58 were maintained closed by the elongated switch actuator 58a shown in FIG. 2. However, the contacts of limit switch 59 were actuated at the top of the carriage travel to move the contacts to the lower circuit closing position shown in FIG. 3. After the weld timer 73 for the vertical seal time has timed out, the vertical cool timer 75 is energized. The periods of energization for both the weld timer 73 and cool timer 75 are indicated by the "heat" and "cool" portions of the cycle shown in curve D in FIG. 4. When the cool timer 75 times out, the coil of relay 76 is energized to operate the control valve $V_4$ and supply pressure to the pressure cylinder 70 in the direction to move the vertical electrode 17 to an open position.

As may be seen in FIG. 3 the cool timer 75 is also in circuit with the lower contacts of switch 59 which were closed when the carriage 25 moved to its up position. The cool timer 75 is also in circuit with the now closed contacts of switch 57 which was closed by the squeezing device 30 and the contacts 57 are also in circuit with the coil 78 of a relay which operates a control valve $V_5$, FIG. 2, to actuate the horizontal sealing pressure cylinder 40 in a direction to close the horizontal sealing jaws 20a, 20b which support the horizontal grippers 23a, 23b and 24a, 24b and the horizontal electrodes 21a, 21b and 22a, 22b. This operation is indicated by curve E in FIG. 4. At this time a circuit is completed by way of switch 68 through the coil of a relay 80, FIG. 2, which operates the control valve $V_3$ to discharge a measured volume of oil from the metering chamber 48 through valve 51 and line 52 into the mandrel 13. This is illustrated by curve B in FIG. 4.

When the pressure in the horizontal sealing cylinder 40 builds up to a predetermined value, it closes the contacts in a pressure switch 81, FIGS. 2 and 3, thereby energizing the coil of relay 82 which is effective to operate the control valve $V_2$, FIG. 2, in a direction to cause the pressure cylinder 34 to open the squeezing device 30. This operation is illustrated by the timing curve F in FIG. 4.

It will be noted from FIG. 3 that when the contacts of pressure switch 81 closed, a circuit was also completed through the normally closed contacts 84a of switch 84 which are in circuit with the weld timer 85. This energized the horizontal weld timer 85 which is in the circuit of the high frequency generator 19, FIG. 1, and controls the time for the horizontal seal or welding operation. It will further be seen that with the closing of the contacts of pressure switch 81 a circuit is completed through the coil of relay 86, FIGS. 2 and 3, to actuate the control valve $V_1$ and apply pressure to the pneumatic cylinder 27 thereby starting the downward motion of the carriage 25. This is illustrated by curve A in FIG. 4.

When the horizontal weld timer 85 times out, the supply of radio frequency from generator 19 to the horizontal welding electrodes 21a, 21b and 22a, 22b is interrupted as indicated by the end of the "heat" portion of the cycle in curve G of FIG. 4. The horizontal cool timer 86 is then energized as indicated by the "cool" portion of the curve G shown in FIG. 4. When the cool timer 86 times out, the coil of relay switch 88 is energized thereby closing its contacts 88a which are in circuit with the coil of relay 90.

During this period it will be recalled that the carriage 25 is moving down as shown in curve A of FIG. 4 and when it reaches the bottom of its stroke, the carriage 25 has traveled one package length. When the carriage 25 reaches the bottom of its stroke, it actuates the contacts of a limit switch 91 moving the contacts to closed position and thereby energizing the coils of relays 92 and 93. Relay 93 as shown in FIG. 2 controls a valve $V_6$ which in turn controls the pressure in a cylinder 95 for limiting the downward movement of the carriage 25. If the film 15 is provided with printing, the system may be provided with an electric eye circuit for controlling the bottom position of the carriage 25. This has been illustrated in FIGS. 2 and 3 by the limit switch device 96 which is adapted to reset the electric eye 97 which closes the contacts 97a to complete a circuit through the coils of relays 92 and 93 as previously described.

When the coil of relay 92 is energized, it closes its contacts 92a which are in series circuit with the then closed contacts 88a to energize the coil of relay 90. Relay 90 operates valve $V_7$ which controls the pressure cylinder 56, FIG. 2, to move the lower horizontal jaws which carry the lower electrodes 21b, 22b and lower grippers 23b, 24b transversely of the axis of the web tube and thereby sever the web tube intermediate the weld area produced by the upper and lower pairs of electrodes 21a, 22a and 21b, 22b to separate a liquid-filled package from the web tube. This cutting operation is illustrated in FIG. 4 by curve H.

After the lower horizontal sealing jaws have been moved by the cut-off cylinder 56, the contacts 84a of limit switch 84 are moved to open position while contacts 84b are moved to closed position, FIG. 3. This energizes the coil of relay 99 to operate valve $V_5$ causing the horizontal sealing jaws to move to open position. At the same time the coil of relay 100 is energized to actuate control valve $V_4$ and cause the pressure cylinder 70 to close the vertical sealing jaw 17. When the horizontal sealing jaws moved to open position, switch 58 was closed thereby completing a circuit through the coil of relay 64 to operate the control valve $V_1$ and cause the pneumatic cylinder 27 to start the upward motion of the carriage 25. Likewise the coil of relay 65 is energized to operate the control valve $V_2$ which controls the cylinder 34 in moving the squeezing device 30 to closed position. The coil of relay 67 is also energized at this time to operate control valve $V_3$ and pressure cylinder 46 in loading the oil pump cylinder 48 from the oil reservoir 45. When the carriage 25 reaches its upper end of travel, the limit switch 59 is actuated. Upon pressure build-up in the vertical seal air cylinder 70, the pressure switch 71 closes, energizing the vertical weld timer 73 and the high frequency circuit from generator 19 to energize the vertical welding electrode 17. From the foregoing it will be seen that the cycle is adapted to repeat itself automatically in accordance with the timing diagram in FIG. 4.

Referring to FIGS. 5-5C, there is diagrammatically illustrated the method of producing liquid-filled packages in accordance with the present invention. The squeezing device 30 comprises a pair of elongated clamping members 31 which extend transversely of the web tube WT, FIG. 5. Each of the clamping members 31 is carried by a pair of rod members 31a which in turn are carried by the pair of cross-head members 30a which are adapted to be connected to the opposite ends of the mechanical linkage 36, FIGS. 1 and 2, for operation by the pressure cylinders 34. The rear ends of the rods 31a are provided with enlarged heads which in normal position as shown in FIG. 5 are held against the respective cross-head members 30a by means of compression springs 33. The springs 33 are adapted to provide a spring bias to the clamping members 31 when the cross-heads 30a have been moved to the clamping position as shown in FIG. 5A. The cross-heads 30a also support the pressure plates 32, 32 by means of pairs of threaded studs 32a, 32a. The threaded studs 32a control the spacing between the pressure plates 32 when the cross-head members 30a are in the clamped position shown in FIG. 5A. Each of the studs 32a is provided with a pair of lock nuts positioned on opposite sides of the cross-head 30a. Thus it will be seen that by loosening the lock nuts 32b the threaded studs 32a may be adjusted relative to the cross-heads 30a to predetermine the spacing between the pressure applying members 32.

In describing the beginning of the operation of the system it will be assumed that the carriage 25 which supports the horizontal jaws, 20a, 20b, FIG. 2, has been adjusted to provide a predetermined length of package. During each cycle of operation of the system the metering chamber 48 will discharge a predetermined volume of liquid into the web tube. However, no pressure will be initially exerted on the liquid in the web tube by the pressure members 32 until after a number of cycles occur. During this time the height of the liquid will build up to a liquid level height intermediate the pressure members 32 where the latter will squeeze the column of liquid after the clamping members 31 have sealed off the column during each fill portion of cycle. The height of the liquid will rise in the pre-bag portion of the web tube after each cycle until it reaches the height just below the clamping members 31.

Although a predetermined volume of liquid is introduced into the web tube during each cycle of operation of the system, the first package produced on the system will hold something less than the predetermined volume. For example, if the volume delivered is one quart of liquid, the first package produced will hold about 9/10 of a quart with no stretch. As each succeeding cycle occurs, approximately 1/10 of a quart will remain behind in the pre-bag area above the horizontal grippers after welding and cause the column height of the liquid to build up until it comes into the range of the bottom of the pressure members 32 of the squeezing device 30. The closing of the pressure members 32 exerts a pressure on the opposite sides of the web tube, squeezing the liquid into the lower package area causing it to stretch by a downward force as shown in FIG. 5A. Thus the package being formed in the package area will start to hold more than the previous 9/10 of one quart. The column of liquid continues to rise after each cycle and move higher and higher into the range of the pressure members 32 which then force more and more liquid into the bag area below. This causes the bag to stretch more and more with each cycle until a state of equilibrium is reached, at which time the bag is stretched to the point at which it accepts a full quart as shown in FIG. 5B. Since one quart is now discharged with each completed bag for each quart of liquid that is delivered from the constant volume pump 48, equilibrium is established and the column height of the liquid no longer changes appreciably with each cycle. In practice, it has been found that it takes approximately ten to fifteen cycles from the start of the system to reach equilibrium. After the package has been filled with liquid and sealed as shown in FIG. 5B, the filled package is severed from the remainder of the web tube and the web tube is pulled down the required distance to repeat the cycle as shown in FIG. 5C.

It will now be assumed that the web tube moved to the bag area by the carriage 25 is longer than the required length. For example, it will be assumed that it is 9¾ inches instead of the required 9½ inches. It would normally be expected that this longer bag would be loaded with more than one quart of liquid. However, the height of the liquid column in the web tube because of the longer bag will also be lowered and equilibrium will be disrupted. The pressure members 32 will not force as much liquid into the next bag to be produced. Thus, this bag is stretched somewhat less and this continues until equilibrium is again attained. The longer bag or package in this instance is not nearly as heavy or "loaded" as it would have been without the compensating action of the squeezing device 30.

It will now be assumed that the length of web tube indexed to the bag area is only 8¾ inches long instead of the required 9½ inches. Under these circumstances the column height of the liquid is higher in the area of the pressure members 32 so that when they close they force more liquid down below the horizontal weld area in the web tube. This causes the bag to stretch more and consequently hold more liquid than it would in the absence of the squeezing device. This is clearly illustrated in the comparison of the two sets of data set forth below. Data I shows the weight variation of liquid-filled packages produced using the system shown in FIGS. 5-5C but omitting the pressure plates 32 which apply pressure to the opposite sides of the column of liquid in the web tube. Even though the clamping blocks 31 sealed off the web tube above the liquid level while the horizontal seals were being made, this did not prevent substantial deviations in weight between different packages. As will be seen from Data I below, the average weight deviations between packages was ±1.8% by weight.

DATA I

|  | Run | Weight (Gms.) | Deviation (Gms.) | ± Percent |
|---|---|---|---|---|
| Pkg. No.: Space |  |  |  |  |
| 1 | A | 710 | 1 |  |
| 2 | A | 720 | 11 |  |
| 3 | A | 718 | 9 |  |
| 4 | A | 719 | 10 |  |
| 5 | A | 689 | 20 |  |
| 6 | A | 735 | 26 |  |
| 7 | A | 687 | 22 |  |
| 8 | A | 720 | 11 |  |
| 9 | A | 695 | 14 |  |
| 10 | A | 693 | 16 |  |
| Average |  | 709 | 14 | 1.8 |

The following Data II shows the weight variation of liquid-filled packages produced by the present invention utilizing the pressure plates 32 shown in FIGS. 5–5C. From the following data it will be seen that a fill accuracy to less than ±.5% by weight is obtained. In fact for one run the accuracy was maintained at less than ±.25% by weight. In all three of the following runs the fill accuracy was at least four times greater than without using the pressure members 32.

DATA II

|  | Weight of filled bag in Gms. | | |
|---|---|---|---|
|  | Run 1 | Run 2 | Run 3 |
| Pkg. No.: Space |  |  |  |
| 1 | 861±1 | 863±1 | 862±2 |
| 2 | 861±1 | 852±10 | 863±3 |
| 3 | 866±4 | 863±1 | 858±2 |
| 4 | 854±8 | 861±1 | 860±0 |
| 5 | 855±7 | 862±0 | 861±1 |
| 6 | 867±5 | 867±5 | 858±2 |
| 7 | 872±10 | 862±0 | 864±4 |
| 8 | 862±0 | 861±1 | 862±2 |
| 9 | 859±3 | 869±7 | 860±0 |
| 10 | 859±3 | 864±2 | 864±4 |
| 11 | 867±5 | 856±6 | 857±3 |
| 12 | 857±5 | 863±1 | 859±1 |
| 13 | 862±0 | 860±2 | 862±2 |
| 14 | 863±1 | 863±1 | 862±2 |
| 15 | 864±2 | 870±8 | 862±2 |
| 16 | 854±8 | 863±1 | 856±4 |
| 17 | 861±1 | 863±1 | 859±1 |
| 18 | 870±8 | 862±0 | 856±4 |
| 19 | 865±3 | 856±6 | 861±1 |
| 20 | 855±7 | 859±3 | 859±1 |
| Average | 862 | 862 | 860 |
| Average Dev | ±4 | ±3 | ±2 |
| Average —Percent Dev | ±0.46 | ±0.35 | ±0.23 |

Referring to FIGS. 6–8, the horinzontal sealing assembly 20 will now be described in detail. The sealing assembly 20 comprises a pair of horizontal jaws 20a, 20b, FIGS. 6 and 8, which are respectively carried by the elongated clamping members or cross-heads 20c and 20d. The cross-heads 20c and 20d are adapted to be reciprocated toward and away from each other on horizontal rods by means of pressure applied from a pair of horizontal pressure cylinders 40, FIGS. 1 and 2, in cooperation with the pressure applying linkages 42. The horizontal jaw 20a comprises a right angle member 110 carried by the cross-head member 20c but electrically insulated therefrom by an insulator plate 111. A similar right angle member 113 in jaw 20b is connected to the cross-head member 20d and electrically insulated therefrom by means of the electrical insulation plate 114.

The members 110 and 113 respectively support the upper pair of grippers 23a and 24a which as previously described are adapted to engage and grip opposite sides of the web tube. The gripper 23a is made of resilient material such as neoprene rubber preferably having a Shore A durometer hardness value of from 60 to 80 so as to permit the member 23a to flatten sufficiently and cooperate with the non-resilient gripper 24a in gripping the web tube. It will be noted that the resilient gripper 23a has a convex surface 23a" which is adapted to mate with the concave surface 24a" in the cooperating non-resilient gripper 24a. The purpose of this is to prevent the web from "bunching" in the weld area and thereby avoid wrinkled seals. The convex-concave surface combination on the grippers 23a, 24a also provides adequate gripping or "grab" for draw-down of the film.

Each of the right angle members 110 and 113, FIG. 8, supports a lower plate 115 and 116 respectively which in turn support the lower pair of grippers 23b and 24b which respectively correspond to the upper grippers 23a and 24a. The lower plates 115 and 116 are connected to the upper right angle members 110 and 113 by bolts 117 and 118 respectively. The welding electrodes 21a, 21b and 22a, 22b are clamped between the respective members 110 and 115 of jaw 20a and members 113 and 116 of jaw 20b.

The non-resilient gripper members 24a and 24b are made from a suitable plastic material such for example as Plexiglas or a reinforced phenolic or equivalent material. This same material may be employed for the inserts 120 and 121 which support the resilient grippers 23a and 23b. Retainer plates 122, 123 are provided for holding the plastic inserts 120 and 121 in position on the respective members 110 and 115. Similarly, retainer plates 124 and 125 are provided for holding the non-resilient gripper members 24a and 24b to the respective members 113 and 116 of jaw 20b. The cooperating upper gripper members 23a and 24a as well as the lower pair of cooperating gripper members 23b and 24b are adapted to be positioned relative to each other by means of shims 126 and 127. This enables the position of the web material to be controlled during a welding operation so that the adjacent faces of the weld will be maintained on the center line of the weld. This control aids in the production of a strong seal and controls the position of the bead of plastic formed at either end of the weld area.

Since the grippers 23a, 24a and 23b, 24b actually contact and close off the web tube prior to the final welding position of the electrodes 21a, 22a and 21b, 22b, liquid product is trapped in the space between the grippers and the electrodes as shown in FIG. 8. Unless this entrapped liquid is released during welding, it will cause a pressure at the corner of the package and protrude through in a manner referred to as a "bayonet" effect. In order to relieve the pressure of this entrapped liquid, the faces of the non-resilient grippers 24a and 24b are provided with vertical slots for releasing the entrapped liquid. These slots 24a' and 24b' are spaced along the respective gripper members as shown in FIG. 9 on gripper member 24a. The spacing of the release slots 24a' and 24b' as well as the depth thereof is determined for the particular web being used to form the packages and the liquir being filled therein. The number of slots, their spacing and dimensions are determined at the start of a run. The release slots 24a' and 24b' should not be too wide or too deep, otherwise local gripping failure will result and a weak spot will be found along the weld. It is, of course, understood that the release slots 24a' and 24b' do not have sharp edges so as to prevent cutting of the plastic webbing.

The present invention also provides a combined welding cutting jaw of novel design. As pointed out above, the electrode of jaw 20a comprises the pair of blades 21a, 21b while the electrode of jaw 20b comprises the pair of blades 22a, 22b. The jaws 20a and 20b are completely RF insulated from the frame of the machine and are sufficient in capacitance and inductance to operate at a resonant frequency consistant with the RF generator power source 19. The jaws 20a and 20b are designed so that the grippers 23a, 23b and 24a, 24b are close to the electrode blades 21a, 21b and 22a, 22b to permit draw-down of the plastic web and protection of the web during sealing. Each of the jaws 20a and 20b are provided with flow passages 110a, 115a, and 113a, 116a, respectively, for passage of a suitable coolant therethrough such as water or oil for cooling the electrode. The source of coolant is illustrated in FIG. 1.

The electrode blades 21a, 21b and 22a, 22b have a length greater than the diameter of the web tube and the welding edges of the electrode blades present a smooth and uninterrupted surface to the plastic web tube. The blades 21a, 21b and 22a, 22b are machine and precision ground for intimate contact and hardened so as to minimize wear.

It is necessary that the lower pair of blades 21b and 22b slide transversely with respect to the upper blades 21a and 22a. As may be seen in FIG. 8, the lower electrode blades 21b and 22b are provided with enlarged openings 21c and 22c through which pass the vertical members 117 and 118. The bottom plate members 115 and 116 likewise are provided with enlarged openings 115c and 116c respectively corresponding to openings 21c and 22c. The welding surfaces of the electrode blades 21a and 21b are maintained in a common vertical plane under the bias of the compression springs 135 which are carried by studs 136 projecting from the cross-head 20c. The springs 135 are positioned between a plate 137 and washers 138 on studs 136. The plate 137 is spaced from the cross-head 20c by means of spacers 139 of electrical insulating material. As may be seen in FIG. 8, the rear end of the lower electrode blade 21b engages an insulator block 141. The plate 137 holds a spacer 142 against the insulator block 141 to maintain the welding surface of the electrode blade 21b in vertical alignment with the corresponding welding surface of the upper electrode blade 21a. Similarly, the rear end of the lower electrode blade 22b engages an insulator block 143 which in turn engages the forward end of the ram or piston 55 of pressure cylinder 56, the latter also being shown in FIG. 2. The lower plate 116 also engages the insulator block 143 and is biased against the block 143 by means of the tension spring 145 which is connected at one end to plate 116 and at the opposite end to the cross-head 20d. As may be seen in FIG. 8, the cylinder 56 is supported by the cross-head 20d.

The hot electrode side consists of the upper and lower electrode blades 22a and 22b while the ground electrode side consists of two similar upper and lower blades 21a, 21b. During a welding operation the upper and lower blade pairs, 21a, 21b and 22a, 22b are aligned to present a perfect surface by positive insulated stops and the aforementioned spring loading such that the parallel planeness of the horizontal and vertical axes are within ±0.25 mill tolerance for any desired clearance setting. The insulated stop structure is illustrated in FIGS. 6 and 7. It will be seen that the jaw 20a is provided with a pair of upper and lower insulator blocks 150 and 151 at the opposite ends of the jaw 20a. The mating jaw 20b is provided with upper and lower cooperating stops formed by insulating blocks 152 and 153 at opposite ends of the jaw 20b. The stop members 152 and 153 are positioned with shim members 154 and 155 which control the position of engagement of the members 150 with the stop members 152 and the lower members 151 with the lower stop members 153. With this arrangement it will be seen that the spacing between the ends of the welding electrodes 21a, 21b and 22a, 22b can be closely controlled so that they have the desired spacing during a welding operation. It will also be seen in FIGS. 6 and 7 that the jaw 20a is provided with a guide block 158 which cooperates with a guide block 159 carried by the jaw 20b. These guide blocks cooperate to guide their respective jaws 20a and 20b into alignment during a gripping operation. Because of the pressures required, i.e. in the order of 1500 p.s.i. for proper operation of the gripper assemblies on the horizontal jaws 20a, 20b, the positive stop structure 150, 152 and 151, 153 maintains a predetermined clearance between the electrode blades 21a, 21b and 22a, 22b when the latter are forced to closed position by the jaws thereby avoiding excess pressure and excess squeeze on the plastic tube.

After the welding and cooling of the horizontal weld have been completed in accordance with the curve G in FIG. 4 as described above, the two upper electrode blades 21a and 22a remain stationary while the lower hot blade 22b is forced to the left in FIG. 8 toward the lower ground blade 21b. This is accomplished by the pressure cylinder 56 which forces the ram 55 to the left as viewed in FIG. 8 moving the insulator block 143 against the righthand ends of plate 116 and electrode blade 22b. It will be seen that the upper electrode blade 22a as well as the channel member 113 are recessed so as not to engage the insulator block 143 during this movement. The electrode blade 22b and associated lower gripper 24b move to the left forcing the cooperating electrode blade 21b and gripper 23b likewise to move to the left against the bias of springs 135. This transverse movement of the lower electrode blades 21b, 22b causes the weld area of the web tube to be severed intermediate its ends along the separation line between the upper pair of electrodes 21a, 22a and the lower pair of electrode blades 21b, 22b.

When the electrode blade 22b has moved to the left a sufficient distance to sever the weld area of the tube, the normally closed micro switch 84 opens, as previously described in connection with FIGS. 2–4, de-energizing the coil in relay 88 and opening the contacts 88a which in turn de-energizes the coil in relay 90 to release the air pressure in cylinder 56. At this time the springs 135 on jaw 110 are effective to force the ground blade 21b back into the position shown in FIG. 8. The ground blade 21b in turn forces the hot blade 22b into position along with the cooperation of spring 145.

The foregoing operation of the pressure cylinder 56 on the lower electrodes 21b and 22b is effective to sever a filled liquid package 11 from the remainder of the web tube. The filled package is adapted to be received in a discharge chute 150, FIG. 1, for delivery of the liquid-filled packages 11 from the system 10. The formation of the horizontal weld and the severing of the package from the web tube are all accomplished while the desired clearance between the electrode blades and the parallel planeness in both the horizontal and vertical axis are maintained. Blade clearance control with relatively high precision is of utmost importance in systems of this invention. For example, if such precision is not maintained during welding, a higher voltage gradient will occur where the gap is reduced and lower voltage gradient if the gap is excessive. The higher voltage damages the plastic web adjacent to the seal area and causes plastic degradation at the weld and often results in weld defects. A low voltage results in under-sealing or a peelable weld. In either event the net result is an unsatisfactory package and where too low a clearance is maintained between the electrodes there will be excessive squeeze down on the plastic.

It is desirable to maintain a low product of capacitance times inductance so as to maintain as high a resonant frequency as possible. For example:

$$F = \frac{1}{2\pi\sqrt{LC}}$$

where
F equals the resonant frequency in megacycles per second,
C equals the capacitance in micromicrofarads, and
L equals the inductance in henries.

A high value of F is desired to achieve rapid heating. This will be seen from the following equation:

$$H = 0.555 \times F \times V^2 \times D \tan\theta \times 10^{-12}$$

where
H equals electrical loss in watts per cubic centimeter,
F equals the frequency in megacycles per second,
V equals the field strength in volts per centimeter,
D equals dielectric constant, and
$\theta$ equals the loss angle.

To achieve a high value of H by use of $V^2$ at low F causes arcing and voltage breakdown of the plastic. By working at a high value of F and a minimum of $V^2$, the high heating rates can be obtained. Since a high F is desired and is related to $L \times C$, the latter becomes extremely important in the design feature of the welding-cutter electrodes 21a, 21b and 22a, 22b. Resonant frequencies up to 50 megacycles per second have been obtained with such electrodes.

As may be seen in FIG. 8, the electrodes 21a, 21b and 22a, 22b have been provided with a radius at the corners so as to reduce the fringe field losses. There is a loss of high frequency power along the edges of the electrodes and out into the plastic webbing beyond the area where the weld is produced. This fringe field loss is quite an appreciable factor particularly on the thicker grades of web material. Where the fringe field effect occurs at a sharp corner, it is intensified. Too small a blade radius causes plastic breakdown and weakening along the weld line due to the high fringe loss effect. Too large a radius causes poor weld by improper plastic flow control. During a welding operation the plastic is forced to flow from the weld area into a reinforcing bead along the weld line with equal distribution above and below the weld. Such a formation is illustrated in FIG. 8. A radius range of from $\frac{1}{32}$ inch to $\frac{1}{16}$ inch has been found to be optimum on the welder-cutter electrode blades.

Packages produced in accordance with the present invention have the appearance of package 11 shown in FIG. 10. It will be noted that package 11 is tightly filled, thus providing an attractive appearance and being easy to handle. Package 11 meets the three requirements specified above for satisfactory commercial use including accurate fill, tight fill and absence of leak. It has been found that multi-ply films are particularly suitable for use in producing liquid-filled packages in accordance with the present invention. For example, two-ply films have been found to be more resistant to corner leaks than packages made from single-ply film. Thus, such multi-ply packages are more resistant to rough handling. For example, a 10-mil, two-ply film of PVC, each ply having a thickness of five mils, was utilized to produce a liquid-filled package in accordance with the present invention. The contact between the two layers of film was intimate by virtue of plasticizer vapors and temperature-pressure regulation during a blown film extrusion process. Such liquid-filled package as shown in FIG. 11 was subjected to a burst test and withstood a pressure over 2,000 pounds.

It is to be noted that when the package did rupture, the seams did not come apart, but, instead, the plastic sheet split. Thus, it was clear that the seals on the package are not the weakest part. It is also to be noted that the packages of the type produced in accordance with the present invention will withstand greater pressures than metal cans for oil or fibre composition containers, the latter types of containers having burst pressures substantially below 2,000 pounds.

For the purposes of this specification and claims, the term "liquid" is defined as including any flowable product having a viscosity measurement at packaging temperature whether liquid or semi-liquid including such products as oil, grease, paint, antifreeze, detergent and the like as well as flowable food products.

It will be apparent from the foregoing description that certain aspects of the invention are equally applicable to the packaging of dry products of the granular and other types. It will also be apparent that other suitable types of films may be used depending upon the type of sealing members being employed. Thus, while there has been described a preferred embodiment of the invention, it will be understood that further modifications may be made without departing from the spirit and scope of the invention as set forth in the appended claims.

What is claimed is:

1. A method of producing a liquid-filled package comprising the steps of
    forming a transverse seal at one end of a tube of web material,
    introducing a predetermined volume of liquid into the tube,
    clamping the tube closed at a location closely above the level of the liquid in the tube,
    partially flattening the tube at a location beneath the clamped end of the tube and the liquid level to force the liquid under pressure within the tube downwardly to a location adjacent the sealed end of the tube, and
    transversely sealing the tube at a location beneath the partially flattened location.

2. A method of producing a liquid-filled package comprising the steps of
    forming web material into a tube having at least one seal extending lengthwise thereof,
    forming a transverse seal at one end of the tube,
    introducing a predetermined volume of liquid into the tube,
    clamping the tube closed at a location closely above the level of the liquid in the tube and displaced from the sealed end to confine the liquid within the tube,
    partially flattening the tube at a location beneath the clamped end of the tube and the liquid level to force the liquid under pressure within the tube downwardly to a location adjacent the sealed end of the tube, and
    transversely sealing the tube at a location beneath the partially flattened location.

3. A method of producing liquid-filled packages comprising the steps of
    forming web material into a tube having at least one seal extending lengthwise thereof,
    forming a transverse seal at one end of the tube,
    advancing the sealed end of the tube a predetermined distance along the longitudinal axis of the tube,
    introducing a predetermined volume of liquid into the tube,
    clamping the tube closed at a location adjacent the level of the liquid within the tube,
    partially flattening the tube at a location beneath the clamped end of the tube and below the liquid level to force the liquid under pressure within the tube downwardly to a location adjacent the sealed end of the tube, and
    transversely sealing the tube at a location beneath the partially flattened location.

4. A method of producing liquid-filled packages according to claim 3 including the steps of concurrently producing the transverse seal at the top of a filled liquid package with the transverse seal at the bottom end of the succeeding liquid-filled package to be produced, and subsequently separating the filled liquid package from the succeeding package to be filled.

5. Apparatus for producing a liquid-filled package comprising
    means for forming web material into a tube having at least one seal extending lengthwise thereof,
    sealing means for forming a transverse seal at one end of the tube,
    means for introducing a predetermined volume of liquid into the tube,
    clamping means for clamping the tube closed at a location displaced from the sealed end of the tube and closely above the normal liquid level to confine the liquid within the tube,
    means cooperating with said clamping means partially to flatten the tube at a location beneath the clamped end of the tube and below the liquid level to force the liquid under pressure within the tube downwardly to a location adjacent the sealed end of the tube, and
    means operable with said first-named transverse sealing means for transversely sealing the tube at a location beneath the partially flattened location to complete the sealing of the liquid-filled package.

6. Apparatus for producing a liquid-filled package according to claim 5 wherein said sealing means for forming a transverse seal comprises a first pair of sealing electrodes positioned on one side of the tube and a second pair of sealing electrodes positioned on the opposite side of the tube in aligned cooperative relation with said first pair, and means for moving said pairs of electrodes into engagement with the opposite sides of the tube to produce a continuous weld area extending transversely of the tube.

7. In a system for packaging liquid in a tube of thermoplastic web material to produce a liquid-filled package, the improvement of a high frequency sealing assembly comprising a support adapted for reciprocal movement along the longitudinal axis of the tube of web material, a pair of sealing electrodes carried by said support on one side of the tube, a second pair of sealing electrodes carried by said support on the opposite side of the tube and positioned in aligned cooperative relation with said first pair, said electrodes in each pair being closely adjacent to each other, means for moving said pairs of electrodes into engagement with the opposite sides of the tube to produce a continuous weld area extending transversely of the tube, two pairs of grippers carried by said support and positioned in cooperative relation on opposite sides of the tube, one of said pairs of grippers being positioned above said pairs of sealing electrodes and the other of said pairs of grippers being positioned below said pairs of sealing electrodes, one of said grippers in each of said pairs being movable concurrently with the corresponding one of said pairs of sealing electrodes to move said grippers into clamping engagement with the opposite sides of the tube of web material, and means for moving one of said electrodes in each pair relative to the other electrode in each of said pairs and transversely of the axis of the said tube to sever the tube intermediate the ends of the weld area, said last-named means concurrently moving said other of said pairs of grippers positioned below said pairs of sealing electrodes, to hold the liquid-filled package as it is severed from the remainder of the tube.

8. In a system for packaging liquid according to claim 7 including stop means for limiting the extent of movement of said pairs of electrodes in their direction of engagement with the opposite sides of the tube of web material during the production of the weld area extending transversely of the tube, said stop means permitting said last-named means to move one of said electrodes in each pair to sever the tube intermediate the ends of the weld area.

9. In a system for packaging liquid in a tube of web material to produce a liquid-filled package, the improvement of a sealing assembly comprising a support adapted for reciprocal movement along the axis of the tube of web material, a first pair of sealing members carried by said support and positioned on one side of the tube, a second pair of sealing members carried by said support and positioned on the opposite side of the tube and positioned in aligned cooperative relation with said first pair, means for moving said pairs of sealing members into engagement with the opposite sides of the tube of web material to produce a continuous seal area extending transversely of the tube, two pairs of grippers carried by said support and positioned in cooperative relation on opposite sides of the tube, one of said pairs of grippers being positioned on one side of said pairs of sealing members and the other of said pairs of grippers being positioned on the other side of said pairs of sealing members, one of said grippers in each of said pairs being movable concurrently with the corresponding one of said pairs of sealing members to move said grippers into clamping engagement with the opposite sides of the tube of web material, means for moving one of said sealing members in each pair relative to the other sealing member in each of said pairs and transversely of the axis of the tube to sever the tube intermediate the ends of the seal area, said last-named means concurrently moving only one of said pairs of grippers positioned to hold the liquid-filled package as it is severed from the remainder of the tube.

10. In a system for packaging liquid in a tube of thermoplastic web material, the improvement of a high frequency sealing assembly comprising a support adapted for reciprocal movement along the longitudinal axis of the tube of web material, at least one pair of sealing electrodes carried by said support and positioned in cooperative relation on opposite sides of the tube, at least one pair of grippers carried by said support and positioned in cooperative relation on opposite sides of the tube, said one pair of grippers being positioned above said pair of electrodes and closely adjacent to each other, means for moving said grippers and said electrodes of the respective pairs into engagement with the opposite sides of the tube at a location below the level of the liquid in the tube to clamp the tube and produce a continuous weld area extending transversely of the tube, and groove structure in the face of one of said grippers engaging the tube to permit escape of liquid entrapped in the tube between the weld area and the area of the tube clamped by said pair of grippers.

11. In a system for packaging a product in a tube of heat-sealable web material, the improvement of a heat-sealing assembly comprising a carriage adapted for reciprocal movement along the longitudinal axis of the tube of web material, a pair of jaws carried by said carriage on opposite sides of said axis, a pair of sealing members carried by one of said jaws, a second pair of sealing members carried by the other of said jaws and positioned in aligned cooperative relation with said first pair, said sealing members in each pair being closely adjacent to each other, means for moving said jaws transversely of said axis to move said pairs of sealing members into engagement with the opposite sides of the tube to produce a continuous seal area extending transversely of the tube, means for moving one of said sealing members in each pair relative to the other sealing member in each of said pairs and transversely of the axis of the said tube to sever the tube intermediate the ends of the seal area, two pairs of grippers carried by said jaws and positioned in cooperative relation on opposite sides of the tube, one of said pairs of grippers being positioned above said pairs of sealing members and the other of said pairs of grippers being positioned below said pairs of sealing members, one of said grippers in each of said pairs being movable concurrently with the corresponding one of said pairs of sealing members to move said grippers into clamping engagement with the opposite sides of the tube of web material, one of said grippers in each of said pairs comprising
a resilient member, and
the other gripper in each of said pairs comprising a non-resilient member,
said resilient member of said grippers including a convex surface for engaging the side of the tube of web material and the non-resilient member of said grippers including a concave surface for cooperation with said convex surface of said resilient member,
said non-resilient member of said grippers including a plurality of spaced slots extending axially of the tube and formed in the concave surface of said non-resilient member which is adapted to engage one of the sides of the tube of web material.

12. In a packaging system according to claim 11 wherein said sealing members comprise high-frequency electrodes including
stop means for limiting the extent of movement of said electrodes in their direction of engagement with the opposite sides of the tube of web material during the production of the seal area extending transversely of the tube.

13. Apparatus for producing a liquid-filled package comprising
means for forming web material into a tube having at least one seal extending lengthwise thereof,
sealing means for forming a transverse seal at one end of the tube,
means for introducing a predetermined volume of liquid into the tube,
clamping means for clamping the tube at a location displaced from the sealed end of the tube to confine the liquid within the tube,
means cooperating with said clamping means partially to flatten the tube at a location beneath the clamped end of the tube and below the liquid level to force the liquid within the tube downwardly to a location adjacent the sealed end of the tube,
means operable with said first-named transverse sealing means for transversely sealing the tube at a location beneath the partially flattened location to complete the sealing of the liquid-filled package,
a first pair of grippers positioned in cooperative relation on opposite sides of the tube and above said sealing means for forming the transverse seal, and
a second pair of grippers positioned in cooperative relation on opposite sides of the tube and beneath said sealing means for forming the transverse seal,
said pairs of grippers being adapted to clamp the tube through the column of liquid therein prior to the formation of the transverse seal by said sealing means.

14. Apparatus for producing a liquid-filled package comprising
means for forming web material into a tube having at least one seal extending lengthwise thereof,
sealing means for forming a transverse seal at one end of the tube,
means for introducing a predetermined volume of liquid into the tube,
clamping means for clamping the tube at a location displaced from the sealed end of the tube to confine the liquid within the tube,
means cooperating with said clamping means partially to flatten the tube at a location beneath the clamped end of the tube and below the liquid level to force the liquid within the tube downwardly to a location adjacent the sealed end of the tube,
means operable with said first-named transverse sealing means for transversely sealing the tube at a location beneath the partially flattened location to complete the sealing of the liquid-filled package, said sealing means for forming a transverse seal comprising a first pair of sealing electrodes positioned on one side of the tube and a second pair of sealing electrodes positioned on the opposite side of the tube in aligned cooperative relation with said first pair,
means for moving said pairs of electrodes into engagement with the opposite sides of the tube to produce a continuous weld area extending transversely of the tube, and
means for moving one of said electrodes in each pair relative to the other electrode in each of said pairs and transversely of the axis of the tube to sever the tube intermediate the ends of the weld area and thereby separate a liquid-filled package from the tube.

15. In a system for packaging liquid in a tube of thermoplastic web material to produce a liquid-filled package, the improvement of a high frequency sealing assembly comprising
a support adapted for reciprocal movement along the longitudinal axis of the tube of web material,
a pair of sealing electrodes carried by said support on one side of the tube,
a second pair of sealing electrodes carried by said support on the opposite side of the tube and positioned in aligned cooperative relation with said first pair, said electrodes in each pair being closely adjacent to each other,
means for moving said pairs of electrodes into engagement with the opposite sides of the tube to produce a continuous weld area extending transversely of the tube,
two pairs of grippers carried by said support and positioned in cooperative relation on opposite sides of the tube,
one of said pairs of grippers being positioned above said pairs of sealing electrodes and the other of said pairs of grippers being positioned below said pairs of sealing electrodes,
one of said grippers in each of said pairs being movable concurrently with the corresponding one of said pairs of sealing electrodes to move said grippers into clamping engagement with the opposite sides of the tube of web material,
groove structure in the face of one of said grippers in each pair engaging the tube to permit the escape of liquid entrapped in the tube between the weld area and the area of the tube clamped by said pairs of grippers, and
means associated with said electrodes to sever the tube intermediate the ends of the weld area.

16. In a system for packaging liquid in a tube of thermoplastic web material, the improvement of a high frequency sealing assembly comprising
a support adapted for reciprocal movement along the longitudinal axis of the tube of web material,
a pair of sealing electrodes carried by said support on one side of the tube,
a second pair of sealing electrodes carried by said support on the opposite side of the tube and positioned in aligned cooperative relation with said first pair, said electrodes in each pair being closely adjacent to each other,
means for moving said pairs of electrodes into engagement with the opposite sides of the tube to produce a continuous weld area extending transversely of the tube,
means for moving one of said electrodes in each pair relative to the other electrode in each of said pairs and transversely of the axis of the said tube to sever the tube intermediate the ends of the weld area,
two pairs of grippers carried by said support and positioned in cooperative relation on opposite sides of the tube,
one of said pairs of grippers being positioned above said pairs of sealing electrodes and the other of said pairs of grippers being positioned below said pairs of sealing electrodes, one of said grippers in each of said pairs being movable concurently with the corresponding one of said pairs of sealing electrodes to move said grippers into clamping engagement with the opposite sides of the tube of web material, one of said grippers in each of said pairs comprising a resilient member, and the other gripper in each of said pairs comprising a non-resilient member, said non-resilient member of said grippers including a plurality of spaced slots extending axially of the tube and formed in the face of said non-resilient member which is adapted to engage one of the sides of the tube of web material.

17. In a system for packaging liquid in a tube of web material to produce a liquid-filled package, the improvement of a sealing assembly comprising a support adapted for reciprocal movement along the axis of the tube of web material, a first pair of sealing members carried by said support and positioned on one side of the tube, a second pair of sealing members carried by said support and positioned on the opposite side of the tube and positioned in aligned cooperative relation with said first pair, means for moving said pairs of sealing members into engagement with the opposite sides of the tube of web material to produce a continuous seal area extending transversely of the tube, two pairs of grippers carried by said support and positioned in cooperative relation on opposite sides of the tube, one of said pairs of grippers being positioned on one side of said pairs of sealing members and the other of said pairs of grippers being positioned on the other side of said pairs of sealing members, one of said grippers in each of said pairs being movable concurrently with the corresponding one of said pairs of sealing members to move said grippers into clamping engagement with the opposite sides of the tube of web material, groove structure in the face of one of said grippers in each of said pairs of grippers engaging the tube to permit escape of liquid entrapped in the tube between the seal area and the area of the tube clamped by said pairs of grippers, and means associated with said sealing members to sever the tube intemediate the ends of the seal area transversely of the axis of the tube.

References Cited
UNITED STATES PATENTS

| | | | |
|---|---|---|---|
| 2,113,658 | 4/1938 | Lakso | 53—180 |
| 2,257,823 | 10/1941 | Stokes | 53—27 |
| 2,479,375 | 8/1949 | Langer. | |
| 2,613,488 | 10/1952 | Attride | 53—182 X |
| 2,618,814 | 11/1952 | Paton et al. | 53—182 X |
| 2,761,264 | 9/1956 | Gossett | 53—28 X |
| 2,764,862 | 10/1956 | Rado | 53—180 |
| 3,001,348 | 9/1961 | Rado | 53—182 |
| 3,195,285 | 7/1965 | Toss | 53—182 |
| 3,234,069 | 2/1966 | Szasz | 53—182 X |
| 3,287,199 | 11/1966 | Virta | 53—182 X |

WILLIAM W. DYER, JR., *Primary Examiner.*

GRANVILLE Y. CUSTER, JR., *Examiner.*